US008910119B2

(12) United States Patent
Ivanova

(10) Patent No.: US 8,910,119 B2
(45) Date of Patent: Dec. 9, 2014

(54) SYSTEM AND METHOD FOR DISPLAYING COMPONENT INFORMATION OF A TRACE

(75) Inventor: Gorka J. Ivanova, Sofia (BG)

(73) Assignee: SAP AG, Walldorf (DE)

( * ) Notice: Subject to any disclaimer, the term of this patent is extended or adjusted under 35 U.S.C. 154(b) by 2037 days.

(21) Appl. No.: 11/647,811

(22) Filed: Dec. 29, 2006

(65) Prior Publication Data

US 2008/0163178 A1   Jul. 3, 2008

(51) Int. Cl.
*G06F 9/44* (2006.01)

(52) U.S. Cl.
USPC .......................................... 717/124; 717/128

(58) Field of Classification Search
USPC ................. 717/100, 104–113, 120, 124–128; 709/224
See application file for complete search history.

(56) References Cited

U.S. PATENT DOCUMENTS

| | | | | |
|---|---|---|---|---|
| 5,406,491 A * | 4/1995 | Lima | | 701/412 |
| 5,442,740 A | 8/1995 | Parikh | | |
| 5,898,873 A * | 4/1999 | Lehr | | 717/125 |
| 5,960,199 A * | 9/1999 | Brodsky et al. | | 717/128 |
| 6,055,492 A | 4/2000 | Alexander et al. | | |
| 6,189,142 B1 * | 2/2001 | Johnston et al. | | 717/125 |
| 6,219,826 B1 * | 4/2001 | De Pauw et al. | | 717/116 |
| 6,282,701 B1 | 8/2001 | Wygodny et al. | | |
| 6,658,652 B1 | 12/2003 | Alexander et al. | | |
| 7,665,064 B2 * | 2/2010 | Able et al. | | 717/117 |
| 2003/0088854 A1 * | 5/2003 | Wygodny et al. | | 717/130 |
| 2005/0183143 A1 | 8/2005 | Anderholm et al. | | |
| 2005/0229154 A1 * | 10/2005 | Hiew et al. | | 717/110 |
| 2006/0015612 A1 * | 1/2006 | Shimazaki et al. | | 709/224 |

OTHER PUBLICATIONS

Non-final Office Action for U.S. Appl. No. 11/647,640 mailed Jan. 31, 2011, whole document.
Final Office Action for U.S. Appl. No. 11/647,640 mailed Sep. 22, 2011, whole document.
Advisory Action for U.S. Appl. No. 11/647,640 mailed Nov. 9, 2011, whole document.
Non-final Office Action for U.S. Appl. No. 11/647,640 mailed Nov. 30, 2012, whole document.
Final Office Action for U.S. Appl. No. 11/647,640 mailed Feb. 19, 2013, whole document.
Advisory Action for U.S. Appl. No. 11/647,640 mailed Apr. 12, 2013, whole document.
Non-final Office Action for U.S. Appl. No. 11/647,640 mailed Dec. 17, 2013, whole document.

* cited by examiner

*Primary Examiner* — Ebrahim Golabbakhsh
(74) *Attorney, Agent, or Firm* — Blakely Sokoloff Taylor & Zafman LLP

(57) ABSTRACT

A system and method for displaying a trace are described. In an embodiment, the described trace display includes a navigational map that illustrates the linear path taken to get to a selected logical unit and may be used to go back to any previously viewed logical unit in that path. The trace display also includes information section to display relevant information about the currently selected logical unit of the trace.

15 Claims, 8 Drawing Sheets

SYSTEM AND METHOD FOR DISPLAYING COMPONENT INFORMATION OF A TRACE

BACKGROUND

1. Field of the Invention

This invention relates generally to the field of data processing systems. More particularly, the invention relates to a system and method for viewing component information and traces.

2. Description of the Related Art

Logging is employed within virtually all data networks. "Logging" refers generally to recording network-related and/or application-related information in response to one or more predefined network/application events. For example, when an end-user opens a TCP connection to a server, or unsuccessfully attempts to gain access to network resources (e.g., by attempting to log in to a particular server), this information is typically recorded as an entry within a log file. Similarly, if a variable within an application rises above a specified threshold value, a log entry indicating the value and the date and time that the threshold value was exceeded may be stored within a log file. Logging techniques may be employed to record any specified network/application event. Network administrators may then review the log files to identify security issues and/or troubleshoot network problems.

Logging functionality is provided within the Java™ 2 Standard Edition ("J2SE™") platform and the Java 2 Enterprise Edition "J2EE™" platform. Referring to FIG. 1, in a Java environment, Java applications 101 make logging calls on "logger" objects 110, 112, 114. Each logger object is used to log messages for a specific system or application component. Loggers are normally named using a hierarchical dot-separated namespace. Logger names can be arbitrary strings, but they are typically based on the package name or class name of the logged component (e.g., such as java.net or javax.swing). In addition, it is possible to create "anonymous" loggers that are not stored in the logger namespace. Loggers are organized in a hierarchical namespace in which child loggers 112, 114 may inherit logging properties from their parents 110 in the namespace.

Each logger 110, 112, 114 may have a threshold "Level" associated with it which reflects a minimum defined logging value (e.g., priority level) that the logger cares about. If a logger's level is set to null, then its effective level is inherited from its parent, which may in turn obtain it recursively from its parent, and so on up the tree.

In response to logging calls from applications 101, the logger objects 110, 112, 114 allocate Log Record objects which are passed to handler objects 130 for publication. For example, a first type of handler object may write log records to an output stream, a second type of handler object may write log records to a file (or to a set of rotating log files) and a third handler may write log records to remote TCP ports. Developers requiring specific functionality may develop a handler from scratch or subclass one of the handlers in J2SE.

Both loggers 110, 112, 114 and handlers 130 may use filters 120, 121 to filter out certain designated types of log records. In addition, when publishing a log record externally, a handler may optionally use a formatter 122 to localize and format the message before writing it to a particular destination. For example, J2SE includes a "simple formatter" for writing short "human-readable" summaries of log records and an XML formatter for writing detailed XML-structured information.

Tracing

"Tracing" is a technique used primarily by software developers to track the execution of program code. For example, when developing an application, developers trace the execution of methods or functions within certain modules to identify problems and/or to determine if the program code may be improved. If a particular method takes an inordinate amount of time to complete, the developer may determine the reasons why and/or change the program code to operate more efficiently.

Developers use trace tools to trace the execution of program code. Trace tools are proprietary application programs which use different techniques to trace the execution flows for an executing program. One technique, referred to as event-based profiling, tracks particular sequences of instructions by recording application-generated events as they occur. By way of example, a trace tool may record each entry into, and each exit from, a module, subroutine, function, method, or system component (sometimes referred to as a "logical unit") within a trace file (e.g., a time-stamped entry may be recorded within the trace file for each such event). Trace events may also be sent to a console or other output destination. Trace files may be stored locally or persisted on a database.

Traditionally traces are displayed as a tree-like structure with the root of the trace sprouting many branches (paths) and leafs (components) to illustrate components and their dependencies. This type of display suffers from at least two deficiencies: 1) for large traces the entire tree cannot be displayed at once and 2) with the full tree displayed it is difficult to display information about a particular component (leaf) of the trace.

FIG. 2 illustrates a prior art component trace display. The trace begins at 207. From this point, the trace breaks into two paths. The first path leads to J2EE engine_1 217. This particular J2EE engine 217 makes external system calls (to component 223) and database calls (to component 221). The external system 225 makes function calls 227 and database calls 229. The second path starts at J2EE engine_2 219 (for this particular example). This engine 219 does not make any function, database, or external system calls.

It is important to note that no information about a particular component is displayed with the trace. Previous techniques for overcoming this problem included displaying information about a component when the cursor "hovered" over the component on the screen displaying the trace.

BRIEF DESCRIPTION OF THE DRAWINGS

Embodiments of the present invention is illustrated by way of example, and not limitation, in the figures of the accompanying drawings in which like references indicate similar elements and in which.

SUMMARY

A system and method for displaying a trace are described. In an embodiment, the described trace display includes a navigational map that illustrates the linear path taken to get to a selected logical unit and may be used to go back to any previously viewed logical unit in that path. The trace display also includes information section to display relevant information about the currently selected logical unit of the trace.

DETAILED DESCRIPTION

As described earlier, traditionally traces are displayed as tree-like structures with the root of each trace sprouting many branches and leafs to illustrate the component dependencies and components of the trace. This type of trace display is wrought with problems. The trace display described below includes a navigational map that illustrates the linear path taken to get to a selected logical unit and may be used to go back to any previously viewed logical unit in that path. The trace display also includes information section to display relevant information about the currently selected logical unit of the trace.

FIGS. 3(a-c) illustrate embodiments of a trace display. The trace display 333 includes a navigation map 301 and one or more informational sections 331. As the trace is analyzed logical unit-by-logical unit, the navigation map 301 updates or refreshes to show the linear path from the beginning of the trace to the currently viewed logical unit. As such, the navigation map 301 provides a current logical unit-by-logical unit view of the trace. Exemplary logical units include, but are not limited to, J2EE engines, databases, external servers, etc. The navigation map may also include an indication of the ends of the currently viewed linear path with markings (such as markings at the beginning of the trace and at the currently viewed logical unit which would be the end of the currently viewed linear path).

Figure 3A:
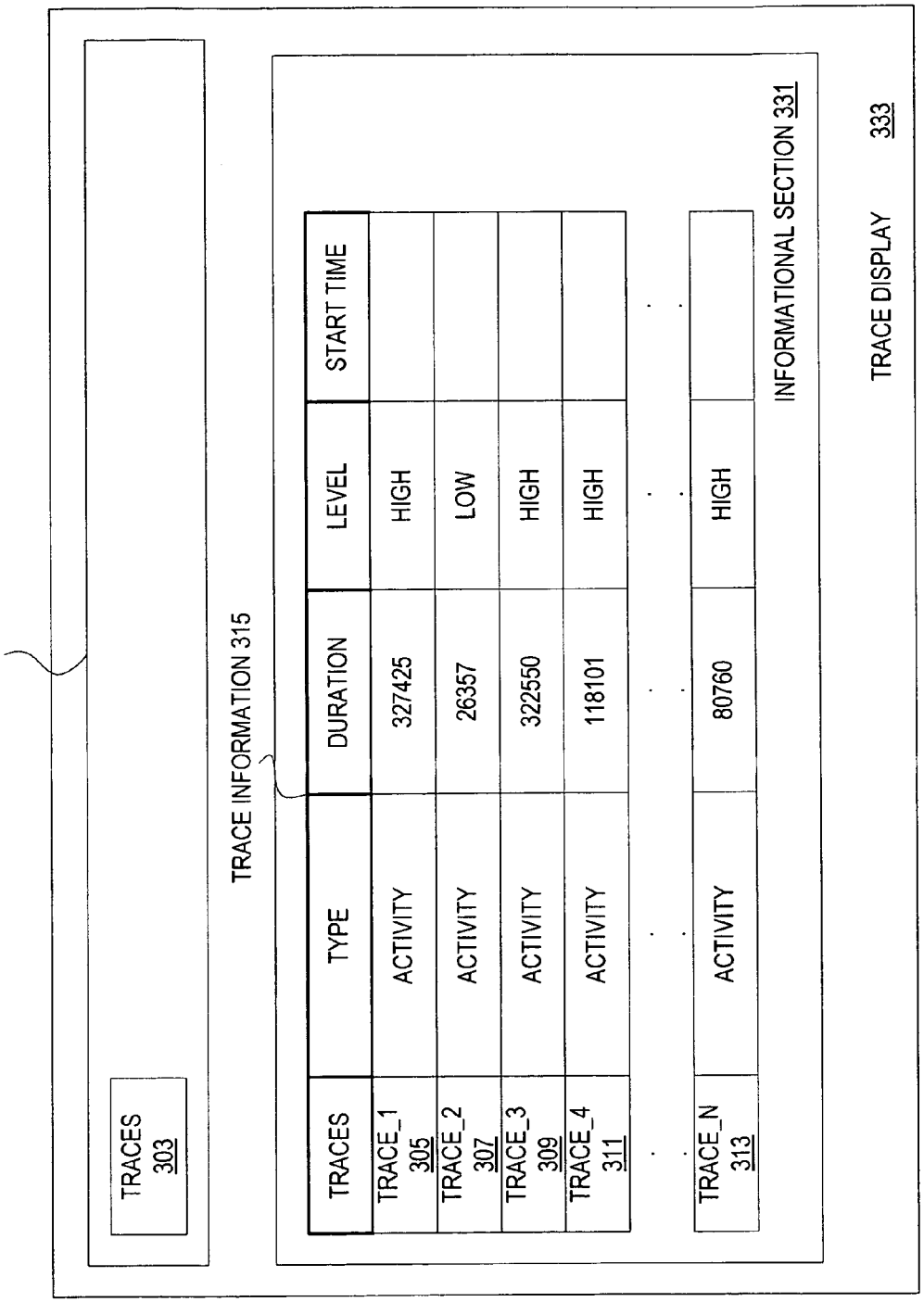
FIGS. 3(a-c) illustrate embodiments of trace display.

FIG. 3(a) illustrates an embodiment of a trace selection display during the trace selection phase. As illustrated, one or more traces (305, 307, 309, 311, and 313) are presented for selection in an informational section 331. Generally these traces have been previously executed, however, an executing trace may be navigated up to the last logical unit evaluated by the trace. Exemplary trace information 315 presented includes one or more of the following: a trace name, trace ID, trace type, duration of the trace, level of the trace, start time of the trace, end time of the trace, etc. In an embodiment, the navigation map 301 is not displayed during trace selection as it generally would not include any helpful information.

Figure 1:
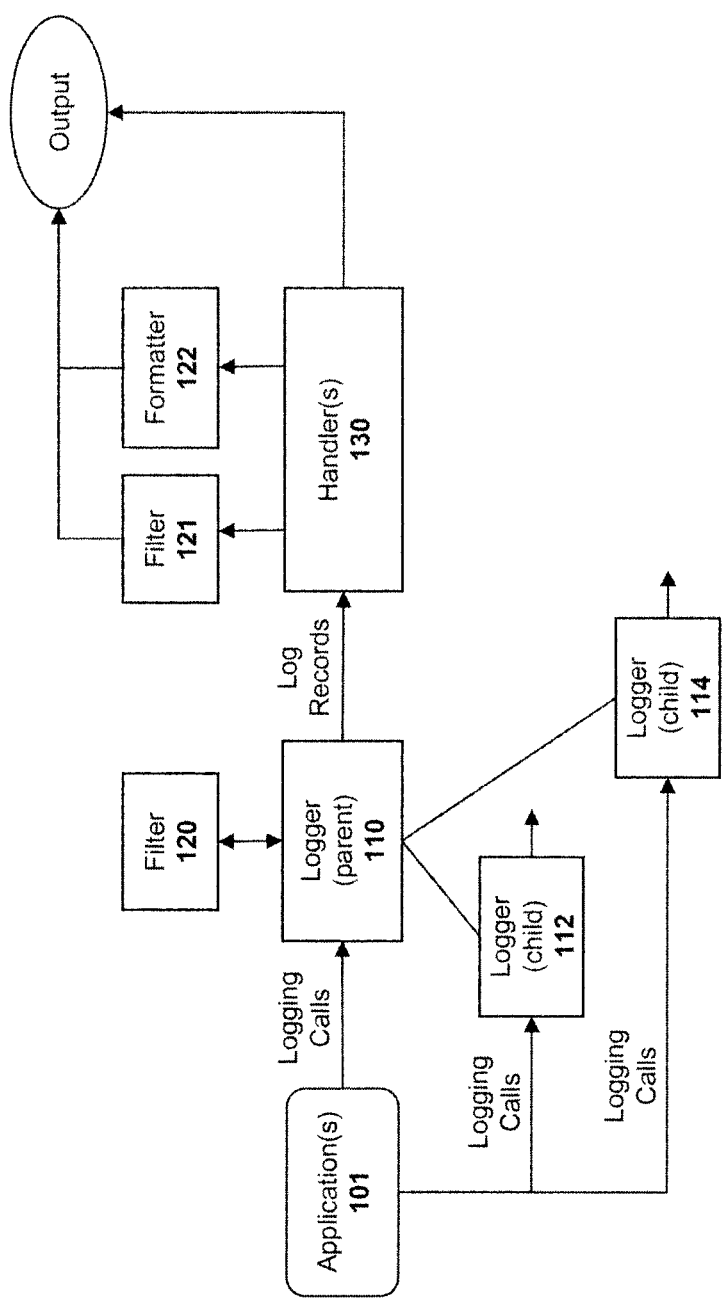
FIG. 1 illustrates a prior art logging system.
Figure 2:
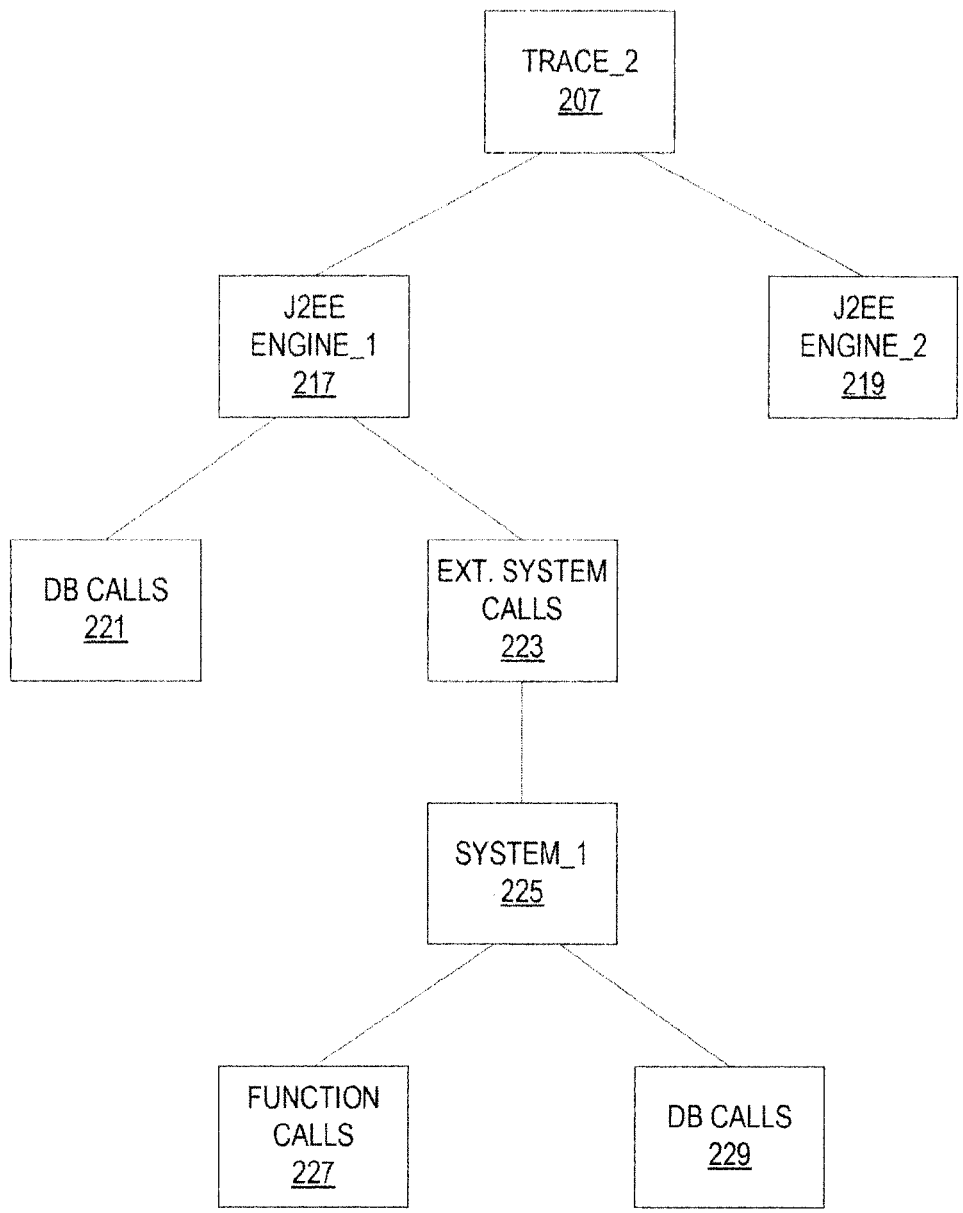
FIG. 2 illustrates a prior art component trace display.
Figure 3B:
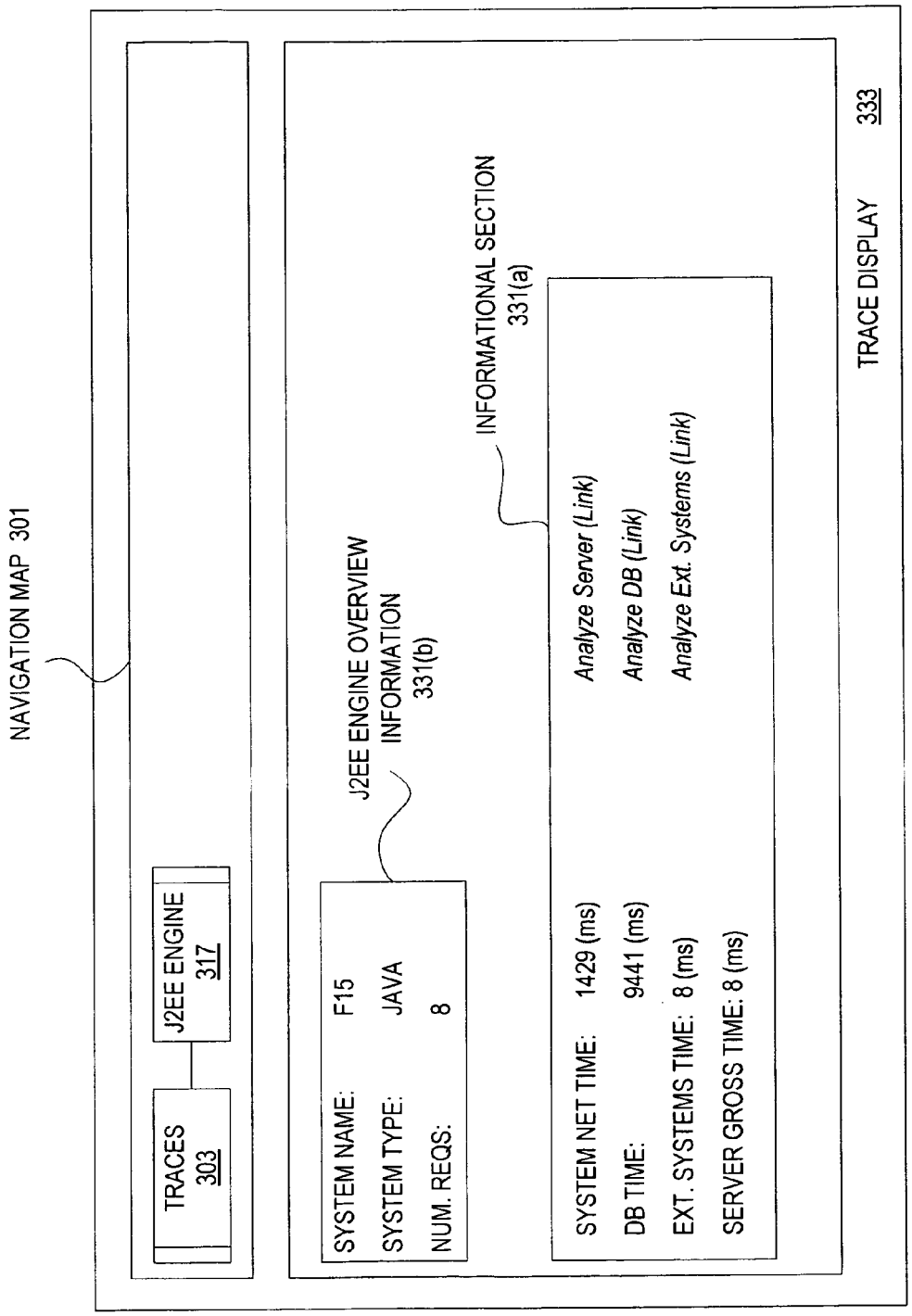

FIG. 3(b) illustrates an embodiment of a trace display after a trace has been selected. For this particular example, trace$_{13}$ 2 307 (trace$_{13}$ 2 207, FIG. 2) was selected. J2EE engine 217 (FIG. 2) is at the highest level of abstraction of trace$_{13}$ 2 207 (it is the first logical unit in the trace, FIG. 2) and therefore begins trace$_{13}$ 2 207. The trace display 331 includes two informational sections 331(a-b) about this logical unit 217. The first section 331(a) shows a current request overview and has specific information about the J2EE engine 217 including system net time, database time, external systems time, and server gross time. This informational section 331(a) also includes links to logical units at a lower level (they are farther down the trace) of the trace (DB calls 221, ext. calls 223) that the J2EE engine 217 access. Through these links, a user may continue to analyze the trace in detail by proceeding farther along the trace 207.

The second informational section 331(b) is an overview of the J2EE engine 217(FIG. 2). This includes the system/engine name, system/engine type, and number of requests to the system/engine.

The trace display 331 also includes a navigation map 301. The navigation map 301 reflects the beginning of trace$_{13}$2 307 (trace$_{13}$ 2 207, FIG. 2) and the currently selected logical unit 217. The icons that represent the logical units of the navigation map 301 are called trace elements which are links to particular logical units in the trace. Accordingly, the navigation map 301 currently shows one trace element J2EE 317 for the currently selected logical unit (J2EE engine 217, FIG. 2). In an embodiment, the last trace element includes an indicator that it is the extreme (end) of the currently viewed trace path. The link 303 to the trace selection phase may also include an indicator. Exemplary indicators include a different color than the other trace elements, bars, etc. The navigation map may also include an indication or indications of the direction of the trace path such as arrows between the trace elements. Trace elements may also serve as links to a particular logical unit.

Figure 3C:
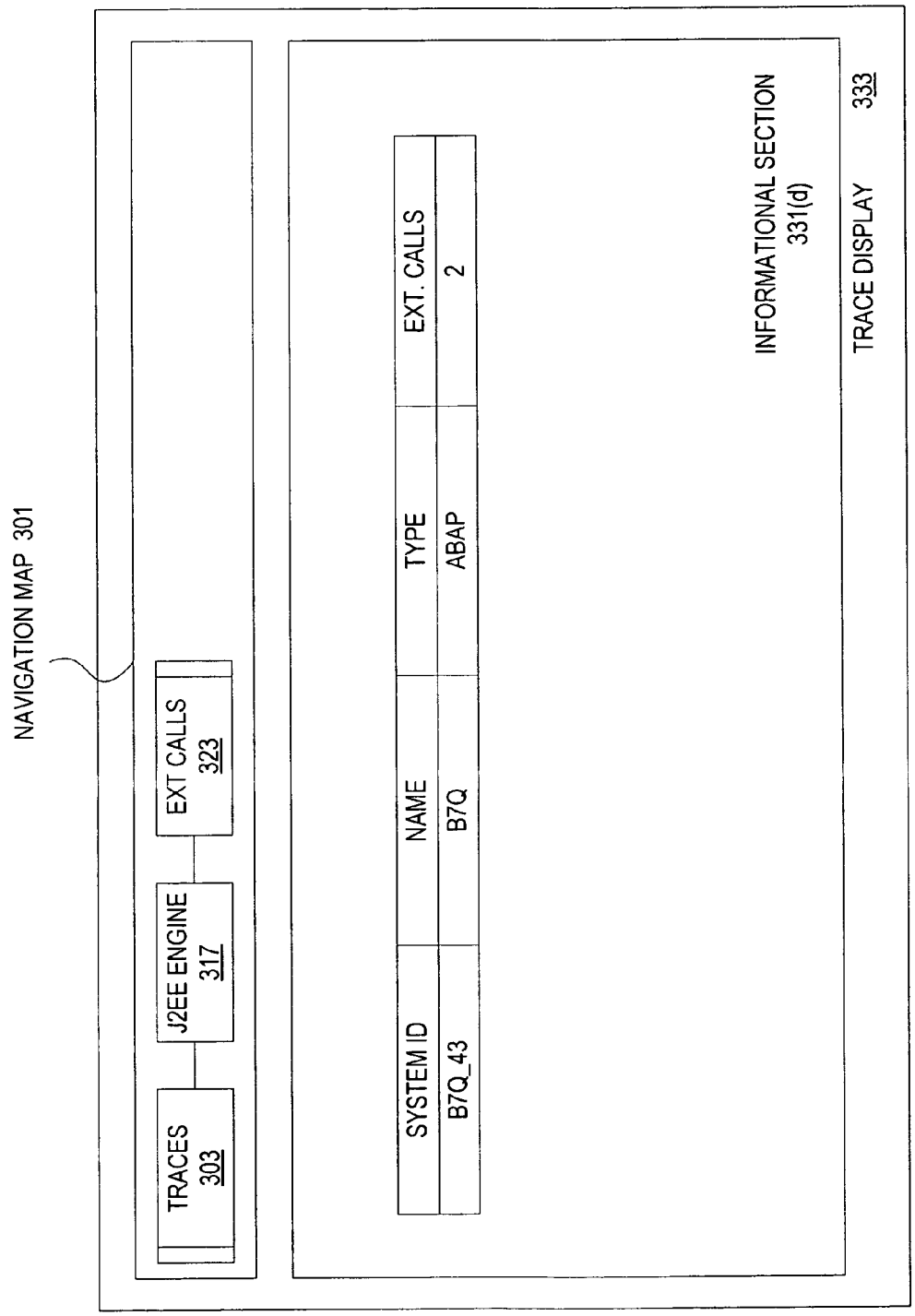

FIG. 3(c) illustrates an embodiment of the trace display after a logical unit at the next (lower) level of the trace has been selected from FIG. 3(b). For this particular example, the calls to the external systems were selected from informational section 331(a) using the "Analyze Ext. Systems" link. The informational section 331(d) shows which external systems were called by the J2EE engine 217 (FIG. 2). In this example only the B7Q external system was called.

The navigation map 301 has been refreshed/updated with a new trace element 323 to reflect the current path to the selected logical unit Ext. System Calls 223 (FIG. 2). From this state of the navigation map 301, a user may chose to go back to J2EE engine 217 (FIG. 2) using trace element 317 or analyze a different trace by selecting the corresponding traces trace element 303 in the navigation map 301. The user may also elect to analyze the only external system called (B7Q) in greater detail through the informational section 331.

Figure 4:
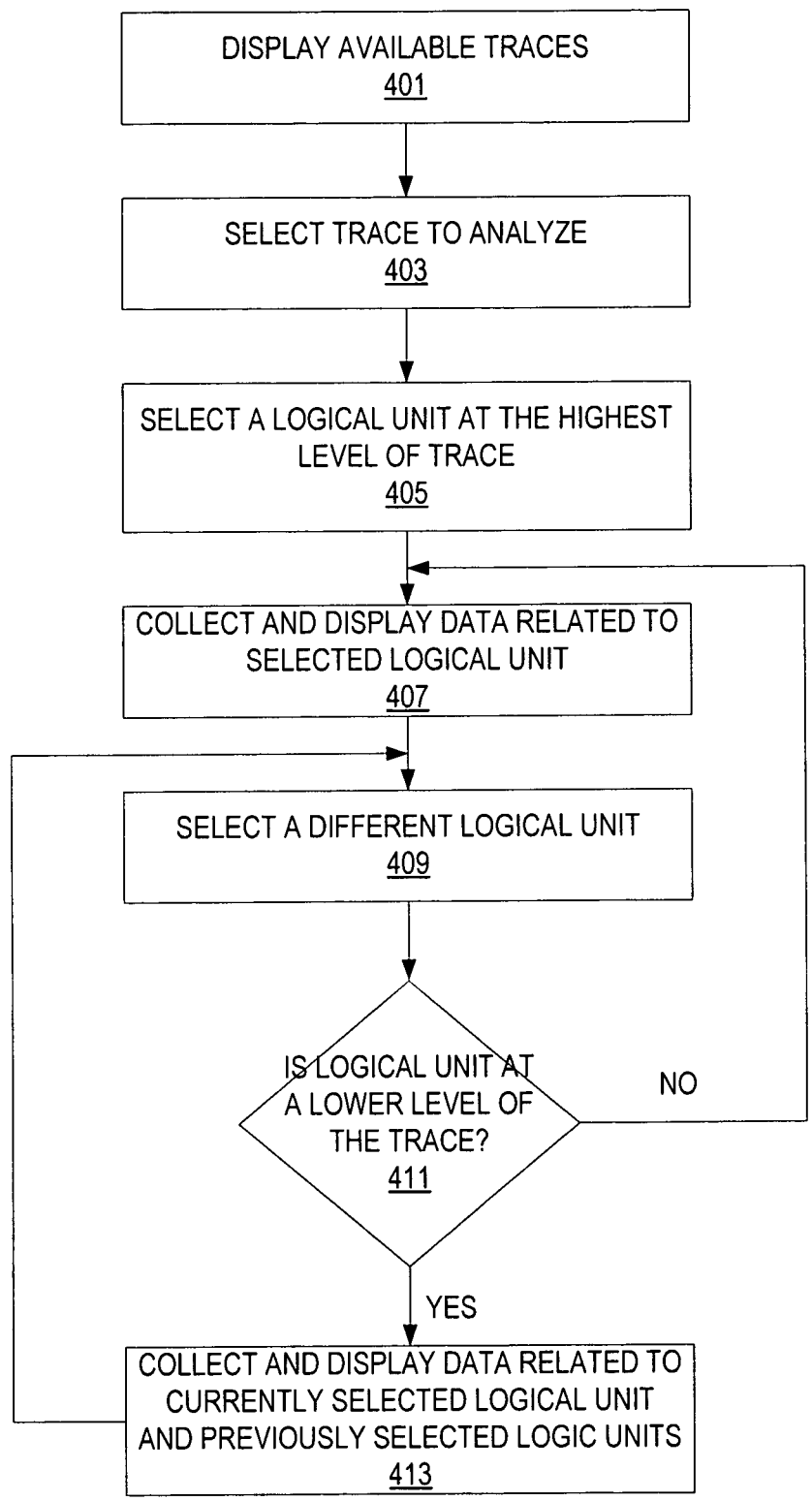
FIG. 4 illustrates an embodiment of a flow for displaying a trace.

FIG. 4 illustrates an embodiment of a flow for displaying a trace. Previously run traces that are available to view are displayed at 401. For example, as illustrated in FIG. 3(a), several different completed traces are available to be displayed.

One of the traces is selected for further analysis at 403. Typically, this selection is received by the system generating the display in the form of a link being selected. For example, the system receives an input from a user that trace_2 307 is to be shown for further analysis.

The logical unit at the first level of the trace is selected at 405. If there are two or more logical units at this level, such as in FIG. 2, several different approaches may be utilized to determine which logical unit should be presented. One approach is to present the user with a choice of which logical unit to display and receive an input from the user indicating which logical unit should be displayed. Another approach is to have the system select the first to be illustrated. This selection may be based on alphabetical order, number of dependent logical units, frequency of logical unit use, etc.

Relevant data associated with the selected logical unit is retrieved from the trace file and displayed in one or more informational sections 331 at 407. This data is collected during the trace. For a database activity this may include the number of calls made and information about those calls; for external system calls this may include the system ID, name of the system, type of system, and the number of calls; for server time this may include the function name, start time, duration, CPU time, etc. Filters may also be used so as to only show data that the user wants or is authorized to see. In an embodiment, the data associated with a displayed logical unit is cached for quicker access if the logical unit may be displayed again. In another embodiment, when a trace is selected all of its associated data is cached for quicker access. At this time the navigation map may also be displayed and/or updated to reflect that this logical unit is being viewed and the linear path to this unit. Generally each time a logical unit is selected both the navigation map and informational sections are updated.

A different logical unit is selected at 409. This selection may be made using the navigation map 301 (go back a level or more) or through a link in the logical unit information window 331. For example, in FIG. 3(*b*), a user may choose to go back to the beginning of the trace 307 or analyze the server 323 or database 321 through their respective links. When a different logical unit is selected, the navigation map 301 updates to reflect the current linear path and the information window 331 updates with data associated with the selected logical unit.

A determination of the level in the trace of the logical unit selected at 409 is made at 411. If the logical unit is not at a lower level, then the data associated with that logical unit is redisplayed in one or more informational sections 331. A selection of a logical unit at a higher level is made via the navigation map 301.

If the logical unit is at a lower level, then the data associated with the logical is retrieved from the trace file and displayed in one or more informational sections 331 at 413. The navigation map 301 is also updated to reflect that the currently selected logical unit at the end of the linear path. A selection of a logical unit at a lower level is made from a link provided in one of the informational sections 331.

Figure 5:
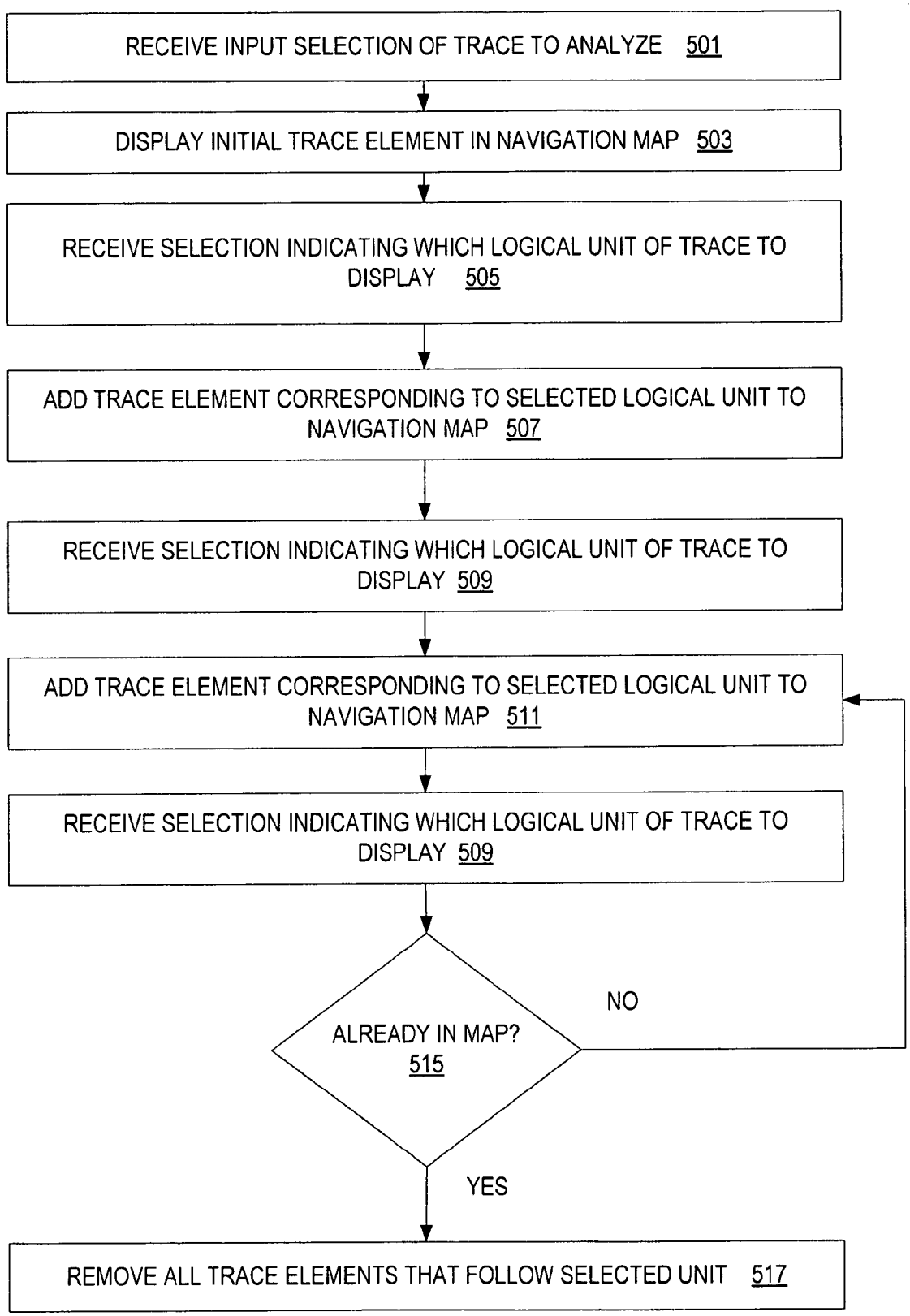
FIG. 5 illustrates an exemplary flow for maintaining a navigational map.

FIG. 5 illustrates an exemplary flow for maintaining a navigational map. An input indicating the selection of a trace to analyze is received at 501. This selection may be input through a link provided in the displayed informational section. The initial trace element which links to the trace selection display is added to the navigation map at 503.

As necessary, an input indicating which logical unit of the trace to display first is received at 505. A trace element associated with the logical unit that begins the selected trace is added to the end of the navigation map and displayed according to that selection input at 507. For example, a trace element associated 317 with logical unit J2EE engine 217 is added to the navigation map 301.

An input indicating the next logical unit of the trace to display is received at 509. This selection is normally made through an informational section link. A trace element associated with this selected logical unit is added to the end farthest from the beginning of the trace at 511. Of course, a user at this point may also decide to view a different trace and select the traces trace element from the navigation map.

An input indicating the next logical unit of the trace to display is received at 513. This selection is made through an informational section link (to a new logical unit) or through the navigation map (to a previously viewed logical unit).

A determination of whether or not the selected logical unit is already in the navigation map is made at 515. If the selected logical unit is already be in the navigation map, then all trace elements that follow the selected unit are removed from the navigation map at 517. If the selected logic unit is not in the navigation map, a trace element associated with this selected logical unit is added to the end of the navigation map at 511.

A trace element associated with this selected logical unit is added to the navigation map at the appropriate location (end of the path) at 510. Of course, a user at this point may also decide to view a different trace and select the traces trace element.

The trace element associated with the logical unit that begins the selected trace is added to the navigation map and displayed according to that selection input. For example, the trace element 317 associated with logical unit J2EE engine 217 (FIG. 2) is added to the navigation map 301.

Closing Comments

As described, embodiments of the present invention present many advantages over the prior art including: 1) a linear navigation map; 2) a navigation map that may be created/updated on-the-fly as a logical unit is selected; and 3) the ability to easily go back to a particular level of the trace and check its properties including children.

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's .NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 6:
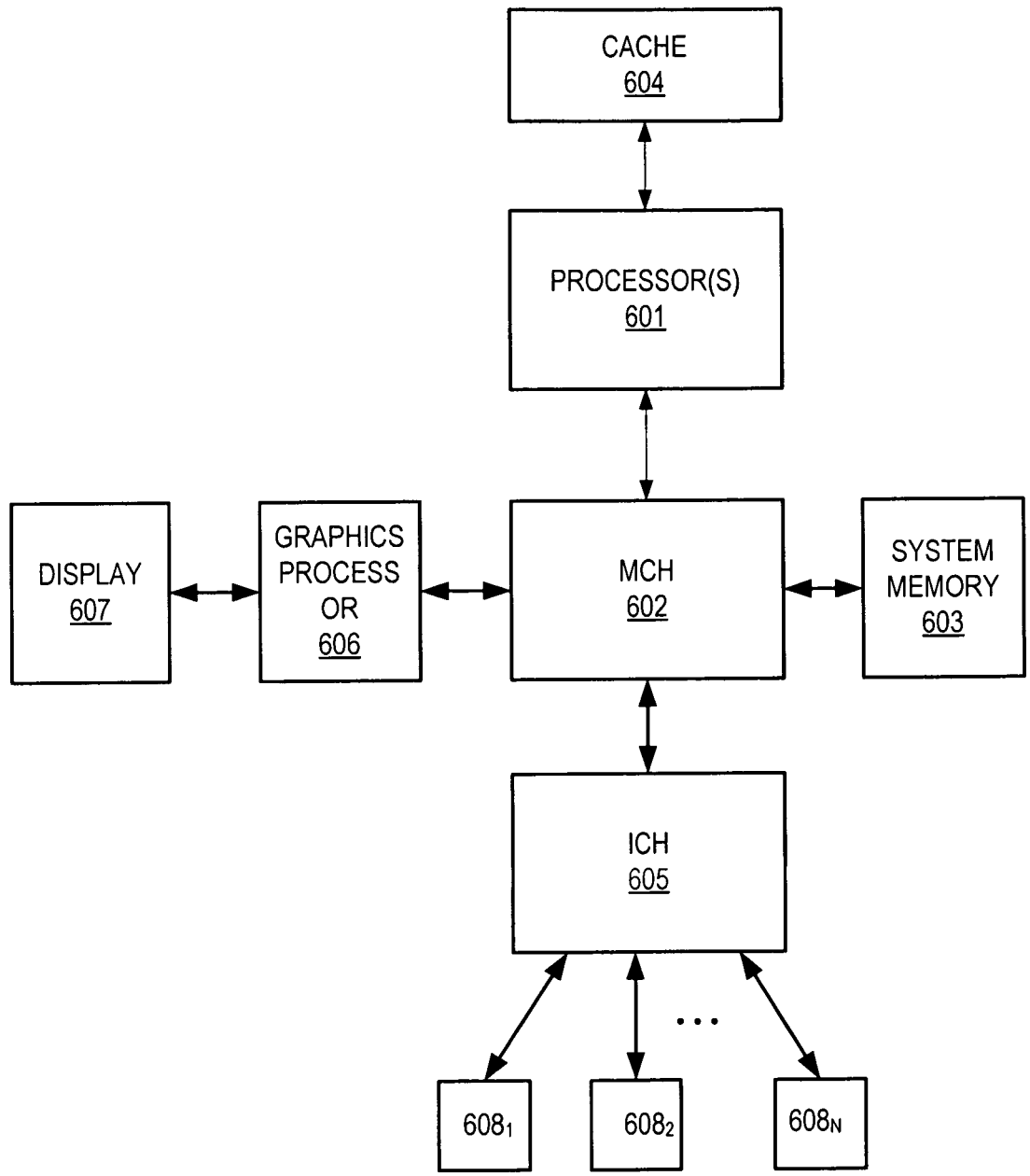
FIG. 6 shows an embodiment of a computing system.

FIG. 6 shows an embodiment of a computing system (e.g., a computer). The exemplary computing system of FIG. 6 includes: 1) one or more processors 601; 2) a memory control hub (MCH) 602; 3) a system memory 603 (of which different types exist such as DDR RAM, EDO RAM, etc,); 4) a cache 604; 5) an I/O control hub (ICH) 605; 6) a graphics processor 606; 7) a display/screen 607 (of which different types exist such as Cathode Ray Tube (CRT), Thin Film Transistor (TFT), Liquid Crystal Display (LCD), DPL, etc.; 8) one or more I/O devices 608.

The one or more processors 601 execute instructions in order to perform whatever software routines the computing system implements. The instructions frequently involve some sort of operation performed upon data. Both data and instructions are stored in system memory 603 and cache 604. Cache 604 is typically designed to have shorter latency times than system memory 603. For example, cache 604 might be integrated onto the same silicon chip(s) as the processor(s) and/or constructed with faster SRAM cells whilst system memory 603 might be constructed with slower DRAM cells. By tending to store more frequently used instructions and data in the cache 604 as opposed to the system memory 603, the overall performance efficiency of the computing system improves.

System memory 603 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 603 prior to their being operated upon by the one or more processor(s) 601 in the implementation of a software program. Similarly, data that a software program determines should be sent from the computing system to an outside entity through one of the computing system interfaces, or stored into an internal storage element, is often temporarily queued in system memory 603 prior to its being transmitted or stored.

The ICH 605 is responsible for ensuring that such data is properly passed between the system memory 603 and its appropriate corresponding computing system interface (and internal storage device if the computing system is so designed). The MCH 602 is responsible for managing the various contending requests for system memory 603 access amongst the processor(s) 601, interfaces and internal storage elements that may proximately arise in time with respect to one another.

One or more I/O devices 608 are also implemented in a typical computing system. I/O devices generally are responsible for transferring data to and/or from the computing system (e.g., a networking adapter); or, for large scale non-volatile storage within the computing system (e.g., hard disk drive). ICH 605 has bi-directional point-to-point links between itself and the observed I/O devices 608.

In the foregoing specification, the invention has been described with reference to specific exemplary embodiments thereof. It will, however, be evident that various modifications and changes may be made thereto without departing from the broader spirit and scope of the invention as set forth in the appended claims. For example, while the navigation map illustrated was in a horizontal orientation, it could of course be illustrated in a vertical or diagonal orientation. The specification and drawings are, accordingly, to be regarded in an illustrative rather than a restrictive sense.

I claim:

1. A trace display system comprising:
   a processor having a cache; and
   a memory coupled to the processor, the memory to store instructions to cause the processor to:
   generate a navigation map to display a particular linear path to a logical unit of a selected trace having logical units at one or more levels of abstraction, wherein the navigation map comprises:
   a link to a trace selection phase to begin the navigation map, and
   at least one trace element corresponding to a logical unit at one level of abstraction of the selected trace; and
   generate a first informational section to display information specific to a currently selected trace element corresponding to the logical unit of the selected trace at the same time the navigation map is displayed, wherein the first informational section includes at least one link to a second logical unit at a next level of abstraction in the selected trace;
   receive an input activating the link to the second logical unit of the trace to analyze;
   adding a second trace element to the navigation map, the second trace element corresponding to the second logical unit at the next level of abstraction in the selected trace;
   collecting specific information about the second logical unit at the next level of abstraction in the trace;
   stopping the display of the first information section with the specific information about the first logical unit while the navigation map is displayed;
   displaying a second informational section with the specific information about the second logical unit of the currently selected trace while the navigation map is displayed, the second informational section providing a selection to a third logical unit at a next level of abstraction in the selected trace; and
   wherein to generate the navigation map to display only the particular linear path of the selected trace is to display or remove trace elements from the navigation map based on which links to the corresponding logical units are currently activated or deactivated in the generated informational section, and to display the trace elements in order by their respective levels of abstraction in the selected trace, the trace elements on one side of the navigation map corresponding to logical units at higher levels of abstraction and the trace elements on an opposite side of the navigation map corresponding to logical units at lower levels of abstraction; and
   further wherein data associated with the selected trace is stored in the cache when the trace is selected.

2. The trace display system of claim 1, wherein the navigation map further comprises: an indication marking at least one end of the particular linear path.

3. The trace display system of claim 1, wherein the navigation map is displayed horizontally.

4. The trace display system of claim 1, wherein the navigation map is displayed vertically.

5. The trace display system of claim 1, wherein the logical unit is one of the following types:
   J2EE engine;
   database; and
   external server.

6. A computer-implemented method comprising:
   receiving a first selection indicating a trace to be analyzed, the selected trace tracking one or more logical units at one or more levels of abstraction of the trace;
   displaying a navigation map illustrating a single linear path to a logical unit of the selected trace, the navigation map including an initial trace element corresponding to a first logical unit at a highest level of abstraction of the trace;
   collecting specific information about the first logical unit;
   displaying a first informational section with the specific information about the first logical unit of the currently selected trace while the navigation map is displayed, the first informational section providing a selection to a second logical unit at a next level of abstraction in the selected trace;

receiving a second selection indicating the second logical unit of the trace to analyze;

adding a second trace element to the navigation map, the second trace element corresponding to the second logical unit at the next level of abstraction in the trace;

collecting specific information about the second logical unit at the next level of abstraction in the trace;

stopping the display of the first information section with the specific information about the first logical unit while the navigation map is displayed;

displaying a second informational section with the specific information about the second logical unit of the currently seleted trace while the navigation map is displayed, the second informational section providing a selection to a third logical unit at a next level of abstraction in the selected trace;

wherein displaying the navigation map illustrating the single linear path to the logical unit of the selected trace is to display or remove trace elements from the navigation map based on which selections of subsequent logical units are currently activated or deactivated in the generated informational section, and to display the trace elements in order by their respective levels of abstraction in the selected trace, the trace elements on one side of the navigation map corresponding to logical units at higher levels of abstraction and the trace elements on an opposite side of the navigation map corresponding to logical units at lower levels of abstraction; and further, wherein data associated with the trace is stored in a cache of a processor upon the first or second selections.

7. The method of claim 6, further comprising:

receiving a third selection indicating the third logical unit of the trace to analyze;

removing one or more of the displayed trace elements including the initial trace element and the second trace element in the navigation map if the third logical unit is at a higher level of abstraction in the trace than one or more of the first or second logical units corresponding to the respective initial and second trace elements;

displaying a third trace element at the end of or in place of the one or more removed trace elements in the navigation map, the third trace element corresponding to the third logical unit;

collecting specific information about the third logical unit;

stopping the display of the second information section; and displaying a third informational section with the specific information about the third logical unit of the currently selected trace, while the navigation map is displayed, the third informational section providing a selection to a subsequent logical unit, if any, at a next level of abstraction in the selected trace.

8. The method of claim 7, wherein the third selection is received from one of a link provided by the initial trace element in the navigation map back to the first selection indicating the trace to analyze, or from a link in the first displayed informational section for receiving a new first logical unit at a highest level of abstraction of the trace.

9. An article of manufacture including program code which, when executed by a machine, causes the machine to perform a method, the method comprising:

receiving a first selection indicating a trace to be analyzed, the trace tracking one or more logical units at one or more levels of abstraction of the trace;

displaying a navigation map illustrating a single linear path to a logical unit of the selected trace, the navigation map including an initial trace element corresponding to a first logical unit at a highest level of abstraction of the trace;

collecting specific information about the first logical unit;

displaying a first informational section with the specific information about the first logical unit of the currently selected trace while the navigation map is displayed, the first informational section providing a selection to a second logical unit at a next level of abstraction in the selected trace;

receiving a second selection indicating the second logical unit of the trace to analyze;

adding a second trace element to the navigation map, the second trace element corresponding to the second logical unit at the next level of abstraction in the trace;

collecting specific information about the second logical unit at the next level of abstraction in the trace;

stopping the display of the first information section with the specific information about the first logical unit while the navigation map is displayed;

displaying a second informational section with the specific information about the second logical unit of the currently selected trace while the navigation map is displayed, the second informational section providing a selection to a third logical unit at a next level of abstraction in the selected trace;

wherein displaying the navigation map illustrating the single linear path to the logical unit of the selected trace is to display or remove trace elements from the navigation map based on which selections of subsequent logical units are currently activated or deactivated in the generated informational section, and to display the trace elements in order by their respective levels of abstraction in the selected trace, the trace elements on one side of the navigation map corresponding to logical units at higher levels of abstraction and the trace elements on an opposite side of the navigation map corresponding to logical units at lower levels of abstraction; and further wherein data associated with the trace is stored in a cache of a processor upon the first or second selections.

10. The article of manufacture of claim 9, wherein the method further comprising:

receiving a third selection indicating the third logical unit of the trace to analyze;

removing one or more of the displayed trace elements including the initial trace element and the second trace element in the navigation map if the third logical unit is at a higher level of abstraction in the trace than one or more of the first or second logical units corresponding to the respective initial and second trace elements;

displaying a third trace element at the end of or in place of the one or more removed trace elements in the navigation map, the third trace element corresponding to the third logical unit;

collecting specific information about the third logical unit;

stopping the display of the second information section; and displaying a third informational section with the specific information about the third logical unit of the currently selected trace, while the navigation map is displayed, the third informational section providing a selection to a subsequent logical unit, if any, at a next level of abstraction in the selected trace.

11. The article of manufacture of claim 10, wherein the third selection is received from one of a link provided by the initial trace element in the navigation map, back to the first selection indicating the trace to analyze, or from a link in the first displayed informational section for receiving a new first logical unit at a highest level of abstraction of the trace.

12. The method of claim 1, wherein the navigation map includes an indication of ends of the particular linear path.

13. The method of claim 1, wherein the link to the trace selection phase includes an indicator.

14. The method of claim 13, wherein the indicator includes at least one of:
- a different color than other trace elements; and
- direction of the particular linear path.

15. The method of claim 1, wherein the at least one informational section includes trace information, wherein the trace information includes at least one of:
- a trace name,
- a trace ID,
- a trace type,
- a duration of a trace,
- level of abstraction of a trace,
- start time of a trace, or end time of a trace.

* * * * *